United States Patent
Morimoto (10) Patent No.: US 6,856,477 B2
(45) Date of Patent: Feb. 15, 2005

(54) POSITION DETECTING APPARATUS, AND OPTICAL APPARATUS AND POSITION DETECTING METHOD COMPRISING THIS

(75) Inventor: Yosuke Morimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/629,197

(22) Filed: Jul. 29, 2003

(65) Prior Publication Data

US 2004/0027587 A1 Feb. 12, 2004

(30) Foreign Application Priority Data

Jul. 31, 2002 (JP) .................................. 2002-224017

(51) Int. Cl.$^7$ ............................ G02B 7/02; G02B 7/14; G02B 7/30
(52) U.S. Cl. ................. 359/824; 359/813; 359/814; 359/823; 324/207.13; 324/207.21; 324/207.24
(58) Field of Search ................. 359/811, 813, 359/814, 819, 822–824, 694, 696; 396/526, 116, 127; 362/455; 353/100; 324/207.11–26

(56) References Cited

U.S. PATENT DOCUMENTS 5,430,375 A * 7/1995 Inoue et al. ........... 324/207.21
6,226,459 B1 * 5/2001 Hamada et al. ............... 396/54

* cited by examiner

*Primary Examiner*—Hung Xuan Dang
*Assistant Examiner*—Joseph Martinez
(74) *Attorney, Agent, or Firm*—Cowan, Liebowitz & Latman, P.C.

(57) ABSTRACT

This invention discloses a position detecting apparatus that can suppress the decrease of position detection accuracy. The position detecting apparatus includes a position sensor outputting position detecting signals which have different phases respectively that change periodically according to the movement of an object, and a phase converting unit generating phase converted signals which have different phases respectively by giving predetermined phase differences to the plurality of position detecting signals. In addition, the position detecting apparatus further includes a first calculating unit obtaining first position data corresponding to a position of the object based on the plurality of position detecting signals, and a second calculating unit obtaining second position data corresponding to a position of the object based on the plurality of phase converted signals. Furthermore, the position detecting apparatus further includes a third calculating unit obtaining a position of the object based on the first and the second position data.

13 Claims, 11 Drawing Sheets

POSITION DETECTING APPARATUS, AND OPTICAL APPARATUS AND POSITION DETECTING METHOD COMPRISING THIS

BACKGROUND OF THE INVENTION

1. Field of the Invention

The present invention relates to a position detecting apparatus and a position detecting method each of which uses a magneto-resistive (MR) element, an optical sensor, and the like, and further an optical apparatus that uses these.

2. Description of Related Art

Conventionally, a position detecting apparatus that uses a magnetoresistive element (hereinafter, this is called an MR element) detects a position by selecting a phase having a signal component with excellent linearity among sinusoidal analog signal components outputted from the MR element with a plurality of phases, and by performing the calculation of interpolating the signal component.

Here, since a phase with a signal component excellent in linearity suitable for interpolation varies according to a position of a measuring object, it is switched at any time according to a position change of the measuring object.

Nevertheless, in the conventional position detecting apparatus described above, position detection result at the time when a phase used for the interpolation is switched to another may become discontinuous when gains and offsets are not accurately adjusted to sinusoidal position detecting signals with a plurality of phases, when gains and offsets of the position detecting signals vary by a drift, a change of environmental temperature, and the like. Owing to this, the accuracy of the position detection may decrease in the vicinity of a position of the object where the change of the phases used for the interpolation occurs.

SUMMARY OF THE INVENTION

The present invention aims to provide a position detecting apparatus and a position detecting method that can detect a position in high accuracy by suppressing the decrease of position detection accuracy caused by discontinuous portions of the position detection result that is a task in conventional technology.

In order to achieve the above-described object, a position detecting apparatus according to the present invention includes: a position sensor that outputs a plurality of position detecting signals which have different phases respectively that change periodically according to a movement of an object; a phase converting unit that generates a plurality of phase converted signals which have different phases respectively by giving predetermined phase differences to the plurality of position detecting signals; a first calculating unit that obtains first position data corresponding to a position of the object on the basis of the plurality of position detecting signals; a second calculating unit that obtains second position data corresponding to a position of the object on the basis of the plurality of phase converted signals; and a third calculating unit that obtains a position of the object on the basis of the first position data and second position data. Then, another form of position detecting apparatus according to the present invention comprises: a plurality of phase converting units that generates a plurality of phase converted signals by giving phase differences, which are respectively different, to the position detecting signals; and a plurality of second calculating units that obtains each of a plurality of second position data on the basis of the phase converted signals generated by each of the plurality of phase converting units, wherein the third calculating unit obtains a position of the object on the basis of the first position data and the plurality of second position data.

An optical apparatus according to the present invention comprises an optical system, wherein the optical apparatus detects a position of at least one optical element in the optical system.

A position detecting method according to the present invention includes: a first step of outputting a plurality of position detecting signals which have different phases respectively that change periodically according to the movement of the object; a second step of generating a plurality of phase converted signals which have different phases respectively by giving predetermined phase differences to the plurality of position detecting signals; a third step of obtaining first position data corresponding to a position of the object on the basis of the plurality of position detecting signals; a fourth step of obtaining second position data corresponding to a position of the object on the basis of the plurality of phase converted signals; and a fifth step of obtaining a position of the object on the basis of the first position data and second position data, wherein the position detecting method generates a plurality of phase converted signals by giving phase differences, which are respectively different, to the position detecting signals at the second step; wherein the position detecting method obtains each of a plurality of second position data on the basis of each of the plurality of phase converted signals at the fourth step; and wherein the position detecting method obtains a position of the object on the basis of the first position data and the plurality of second position data at the fifth step.

An image reading apparatus according to the present invention comprises an image sensing unit that senses an object image; an optical unit adapted to focus the object image; a position sensor that outputs a plurality of position detecting signals which have different phases respectively that change periodically according to a movement of the object; a phase converting unit that generates a plurality of phase converted signals which have different phases respectively by giving each predetermined phase difference to the plurality of position detecting signals; a first calculating unit that obtains first position data corresponding to a position of the optical unit on the basis of the plurality of position detecting signals; a second calculating unit that obtains second position data corresponding to a position of the optical unit on the basis of the plurality of phase converted signals; and a third calculating unit that obtains a position of the optical unit on the basis of the first position data and the second position data, wherein the image sensing unit senses the object image in the position obtained by the third calculating unit.

The features of the position detecting apparatus, optical apparatus, and position detecting method according to the present invention will become clear by the explanation of the following specific embodiments with referring to drawings.

DETAILED DESCRIPTION OF THE PREFERRED EMBODIMENTS

Embodiment 1

Figure 1:
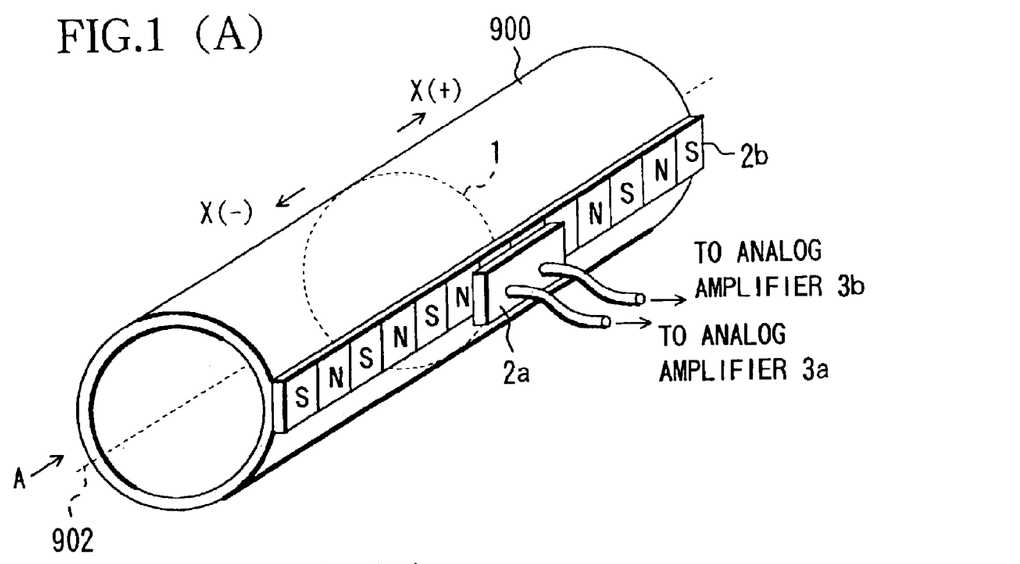
FIGS. 1(A), 1(B), and 1(C) are schematic diagrams showing the structure of a position detecting apparatus that is Embodiment 1.

FIGS. 1(A), 1(B), and 1(C) are schematic diagrams for describing a position detecting apparatus that is Embodiment 1 of the present invention. FIG. 1(A) is an external perspective view of a part of a position detecting apparatus according to this embodiment, and FIG. 1(B) shows a sectional view shown in the direction of the arrow A in FIG. 1(A).

In this embodiment, as shown in FIGS. 1(A) and 1(B), an example of applying the position detecting apparatus to the position detection of a focus lens 1 supported in a lens supporting frame 900.

A detecting magnet (magnetic member) 2b that extends in the direction of an optical axis 902 (namely, in the moving direction of the focus lens 1) and is magnetized in a specific pattern so as to become a reverse polarity alternately in the direction of the optical axis is arranged in the outer circumferential surface of the lens supporting frame 900 integrally. This detecting magnet 2b and an MR sensor 2a being arranged with facing in a predetermined gap g detect the movement of the focus lens 1 in the x(+) and x(−) directions along the direction of the optical axis.

Figure 2:
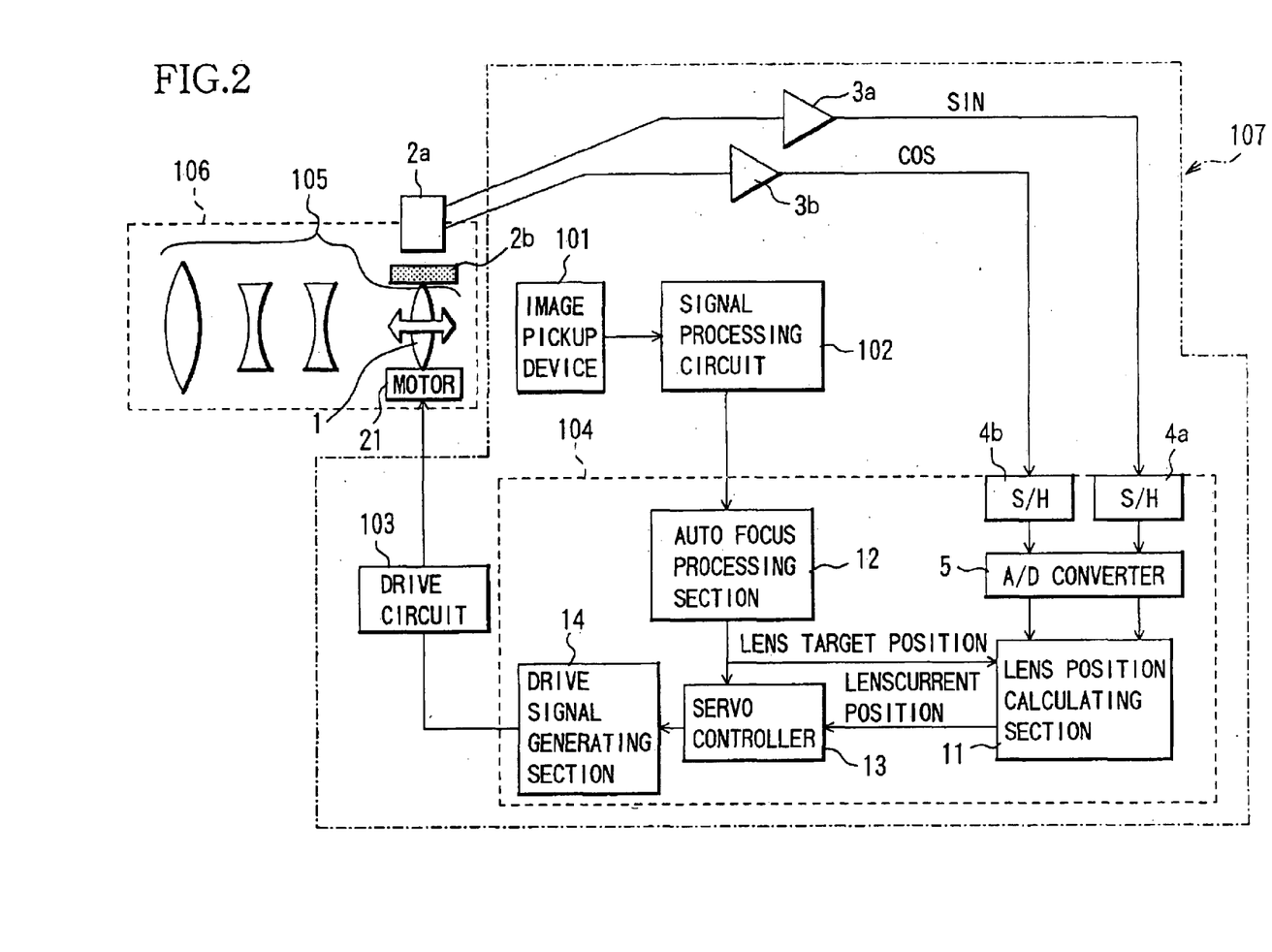
FIG. 2 is a block diagram showing the structure of a camera comprising the position detecting apparatus that is Embodiment 1.

Here, the focus lens 1 (lens supporting frame 900) becomes movable in the direction of the optical axis 902 (x(+) direction and x(−) direction) by a lens drive motor 21 (FIG. 2).

The lens supporting frame 900 may be shorter or longer than the detecting magnet 2b though the lens supporting frame 900 is set to be equal to the detecting magnet 2b in length in the direction of the optical axis in FIG. 1(A). In addition, since the principle, structure, and the like of the position detection by an MR sensor are publicly known, the explanation of them is omitted here.

Here, though such structure that the detecting magnet 2b can move integrally with the focus lens 1 (and, the lens supporting frame 900) as a measuring object is adopted, the present invention is not limited to this. It is also good to arrange the MR sensor in the side of the measuring object that moves.

When the lens supporting frame 900 moves in the x(+) or x(−) direction to the MR sensor 2a (namely, when the MR sensor 2a and detecting magnet 2b relatively move in the x(+) or x(−) direction), two phases of sinusoidal position detecting signals (analog signals) are outputted from the MR sensor 2a according to its displacement amount.

In addition, in this embodiment, though outputs (analog signals) of the MR sensor 2a are made to be two phases, that is, a sine wave and a cosine wave, the scope of the present invention is not limited to this mode. For example, the present invention is also applicable to the outputs of the MR sensor with three or more phases.

Here, a reason why at least two phases of position detecting signals are required is to detect a displacement amount by adding or subtracting a wave number by a counter after determining the movement direction from the phase advance or delay between two sinusoidal signals having phase difference.

In addition, the present invention is not limited to applications where output signals change sinusoidally like the outputs of an MR sensor, but can be also applied to ones whose output signals change periodically.

Figure 3:
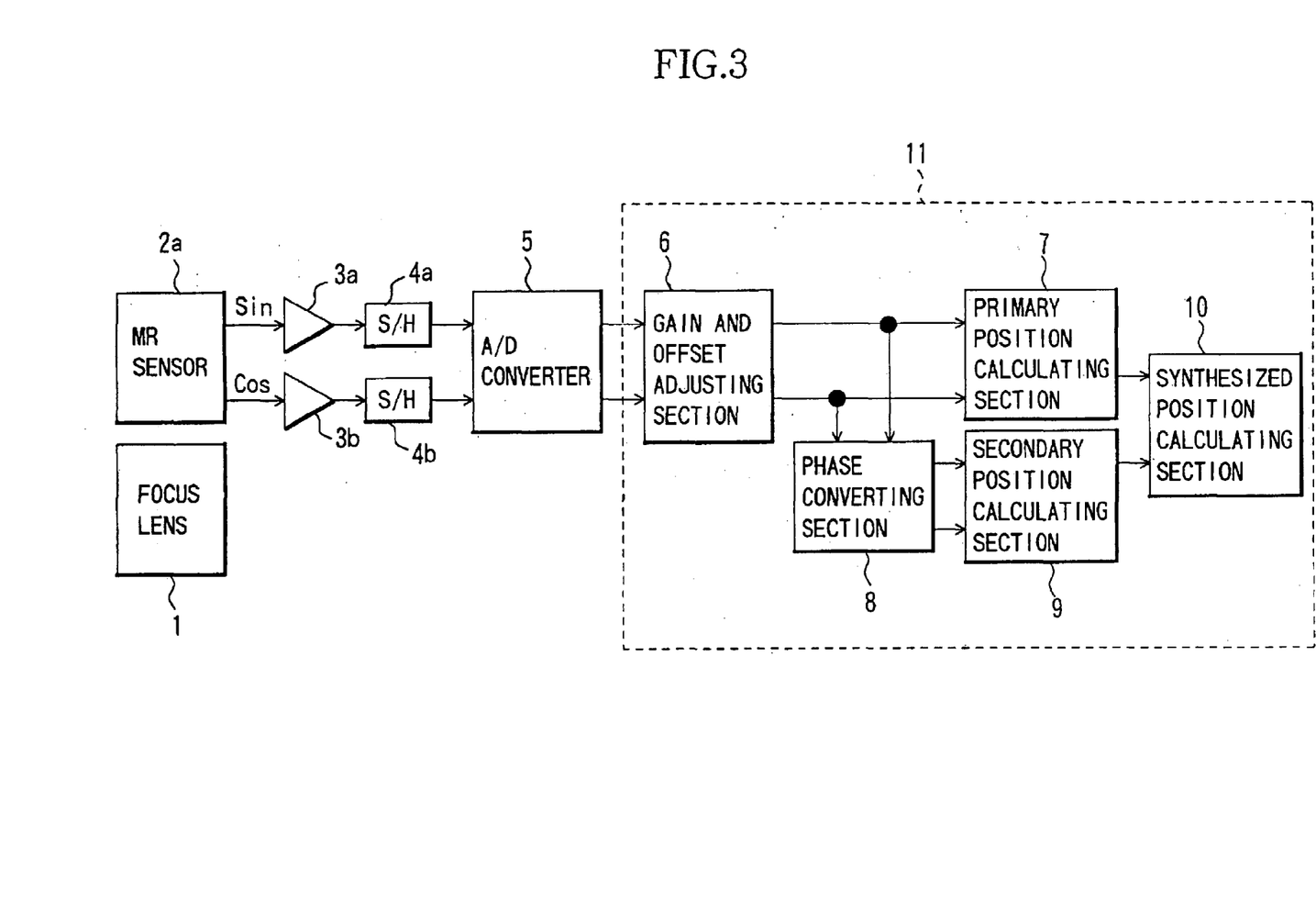
FIG. 3 is a block diagram showing the structure of the position detecting apparatus that is Embodiment 1.

FIG. 2 is a block diagram for describing a lens system comprising a position detecting apparatus that is this embodiment. FIG. 3 is a block diagram for describing the internal structure of the lens position calculating section 11, shown in FIG. 2, and the structure in the vicinity of this section in detail.

In FIG. 2, numerical reference 107 denotes a camera, and numerical reference 106 denotes a lens barrel provided in the camera 107. In addition, the present invention can be applied also to an interchangeable lens system though a camera integrated with a lens barrel is described in this embodiment.

Numerical reference 105 denotes an image pickup optical system provided in the lens barrel 106, and numerical reference 1 denotes a focus lens (optical element) included in the image pickup optical system 105. This focus lens 1 moves in the direction of an optical axis (in the direction of the arrow in FIG. 2) since a drive force from a lens drive motor 21 is transmitted through a drive mechanism not shown.

In addition, numerical reference 101 denotes an image pickup device such as a CCD, or a CMOS sensor, and receives a subject image formed by the image pickup optical system 105 and converts it photoelectrically. A signal output from the image pickup device 101 becomes an image signal by being given various types of processing by a signal processing circuit 102. Then, the signal is recorded on a recording medium (a tape, semiconductor memory, an optical disk, or the like) not shown, and is displayed on an electronic viewfinder (LCD etc.) not shown.

The lens system in this embodiment is provided in a camera performing the processing (auto focus processing) of driving the focus lens 1 to an in-focus position on the basis of a so-called hill-climbing system, namely, a system that detects a peak of a high frequency component in an image signal read from the image pickup device 101.

Here, the position detecting apparatus is used to detect a position etc. of the focus lens 1 in the direction of an optical axis when the auto focus processing is performed.

Schematically, the operation of the auto focus processing is as follows.

First of all, a microcomputer 104 moves the focus lens 1 by an arbitrary displacement amount in the close-up direction (one direction out of the right and left directions in FIG. 2) or the infinite direction (another direction out of the right and left directions in FIG. 2) little by little by driving the lens drive motor 21 through a drive circuit 103.

Then, the microcomputer 104 detects the drive direction of the focus lens 1 so that an AF signal (a high frequency component of an image signal outputted from the image pickup device 101) may increase, on the basis of an output from the signal processing circuit 102. Here, after giving predetermined processing to the output signal (image signal) of the image pickup device 101, the signal processing circuit 102 outputs the signal to the microcomputer 104.

When detecting the drive direction of the focus lens 1, the microcomputer 104 sets a target stop position in the detected drive direction described above, and moves the focus lens 1 by outputting a control signal to the drive circuit 103.

When the AF signal shifts from increase to decrease by driving the focus lens 1 in one direction, the microcomputer 104 determines that the AF signal has passed its own peak value. Then, the microcomputer 104 resets a target stop position and drives the focus lens 1 in the reverse direction so that the AF signal may return to its own peak value.

Namely, the microcomputer 104 moves the focus lens 1 in the close-up direction or the infinite direction while modifying the target stop position of the focus lens 1 so that the AF signal may approach its own peak value. And, when the AF signal becomes the peak value, the microcomputer 104 stops driving the focus lens 1. In addition, a control method of the focus lens 1 is not limited to the above-described one.

In the auto focus processing described above, an auto focus processing section 12 in the microcomputer 104 sequentially outputs a signal relating to a movement destination (target stop position) of the focus lens 1 when moving the focus lens 1 in the close-up direction or the infinite direction.

At this time, the position detecting apparatus detects a current position of the focus lens 1.

A servo controller 13 obtains data, relating to the current position of the focus lens 1, on the basis of an output of a lens position calculating section 11 that constitutes a part of the position detecting apparatus. Then, the servo controller 13 compares the current position of the focus lens 1 with the above-described target stop position, and generates the drive signal of the focus lens 1 in a drive signal generating section 14 so that the focus lens 1 may move to the target stop position.

The signal generated by the drive signal generating section 14 is inputted to a drive circuit 103, and the drive circuit 103 drives a lens drive motor 21 on the basis of the input signal.

Namely, the servo controller 13 continues to drive the focus lens 1 when determining that the focus lens 1 has not moved yet to the target stop position on the basis of the output of the lens position calculating section 11. On the other hand, when the focus lens 1 has completely moved to the target stop position, the servo controller 13 stops the drive of the focus lens 1.

In addition, since the lens system of this embodiment has a plurality of lens units 105 as shown in FIG. 2, it is possible to change a focal length of an image pickup optical system by moving these lens units 105 in the direction of the optical axis (the right and left directions in FIG. 2).

Next, the operation of detecting a position of the focus lens 1 by the position detecting apparatus will be described.

As shown in FIG. 3 in detail, two phases of position detecting signals (analog signals) outputted from an MR sensor 2a according to a position of focus lens 1 are amplified by analog amplifiers 3a and 3b respectively, and are converted into digital signals by an A/D converter 5 through sample-hold circuits 4a and 4b.

Gains and offsets of these digital signals are adjusted by the digital processing executed by a gain and offset adjusting section 6 provided in the lens position calculating section 11. Then, output signals of the gain and offset adjusting section 6 are inputted into a primary position calculating section 7 that is a reference calculating section. Furthermore, the primary position calculating section 7 obtains the position of the focus lens 1 by calculation.

This primary position calculating section 7 obtains reference position data as first position data by calculation on the basis of the position detecting signals outputted from the MR sensor 2a according to a current position of the focus lens 1. The detail of the processing operation in the primary position calculating section 7 will be described later.

Figure 4:
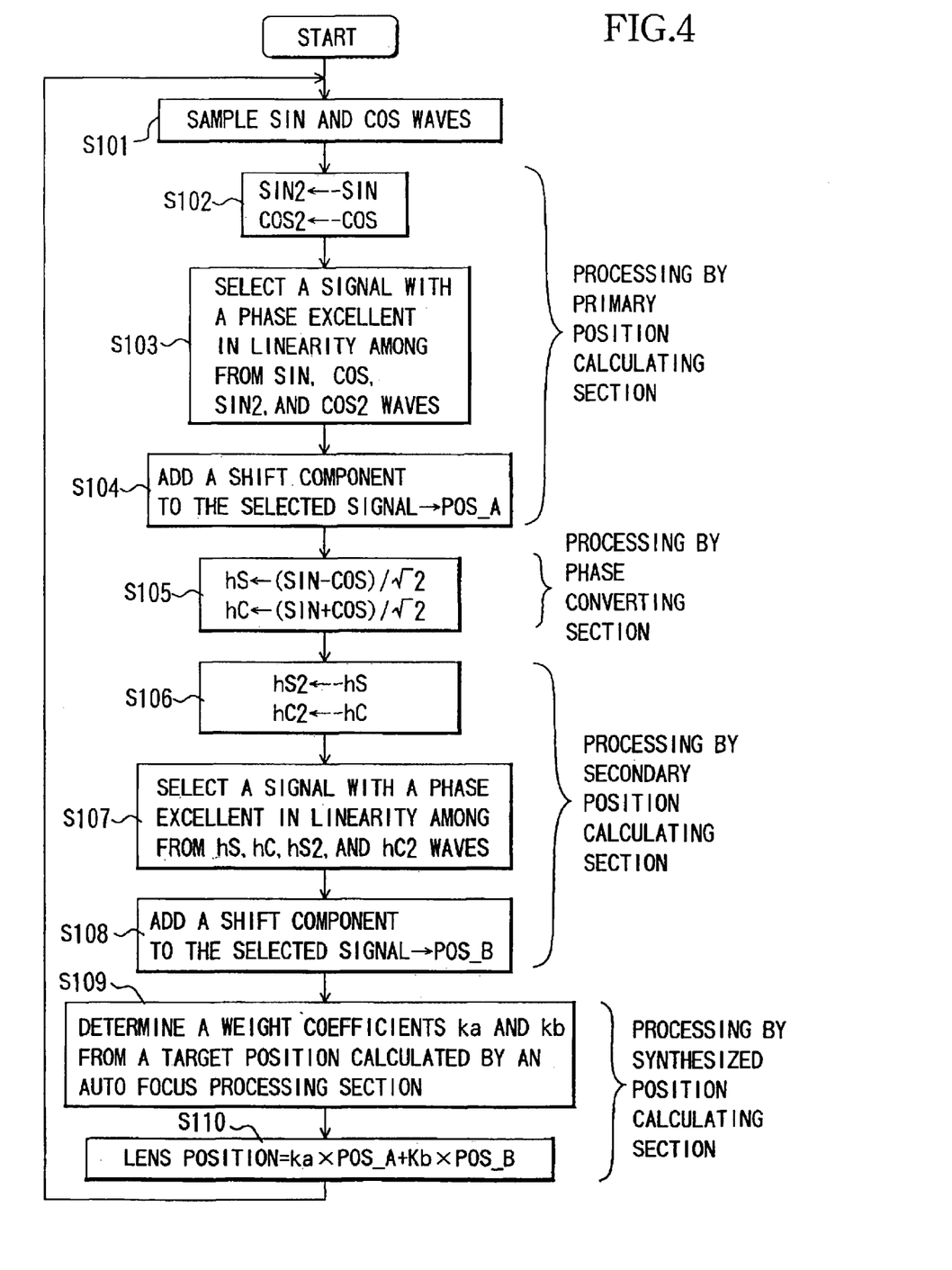
FIG. 4 is a flow chart for describing a position detecting method of a focus lens.

Hereinafter, how to obtain a position of the focus lens 1 will be described according to a flow chart shown in FIG. 4.

Figure 5:
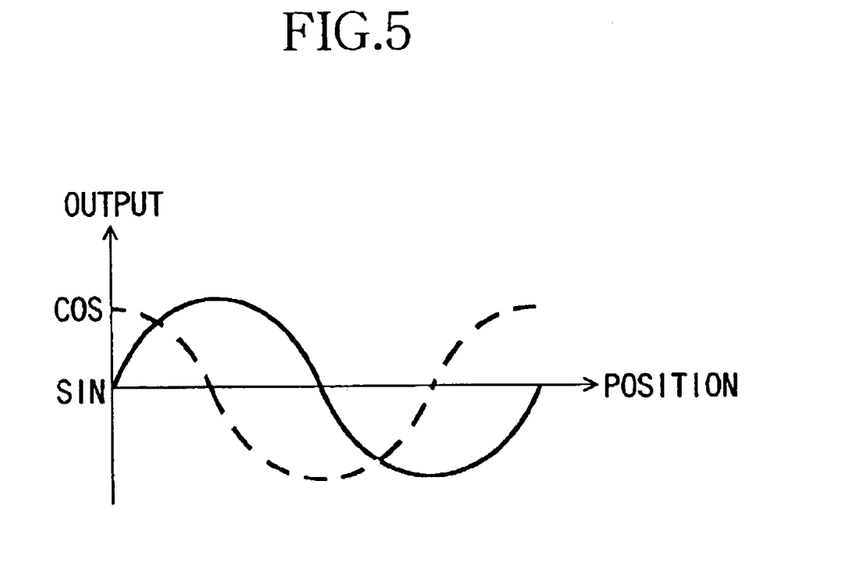
FIG. 5 is a graph showing position detecting signals by an MR sensor after gain adjustment and offset adjustment.

FIG. 5 shows two phases of position detecting signals outputted from the MR sensor 2a, which are signals that are given gain adjustment and offset adjustment by the gain and offset adjusting section 6.

At step 101 (this is called S in FIG. 4), when the position detecting signals outputted from the MR sensor 2a are two phases, that is, a sine wave and a cosine wave as shown in FIG. 5, first of all, these position detecting signals are sampled.

Figure 6:
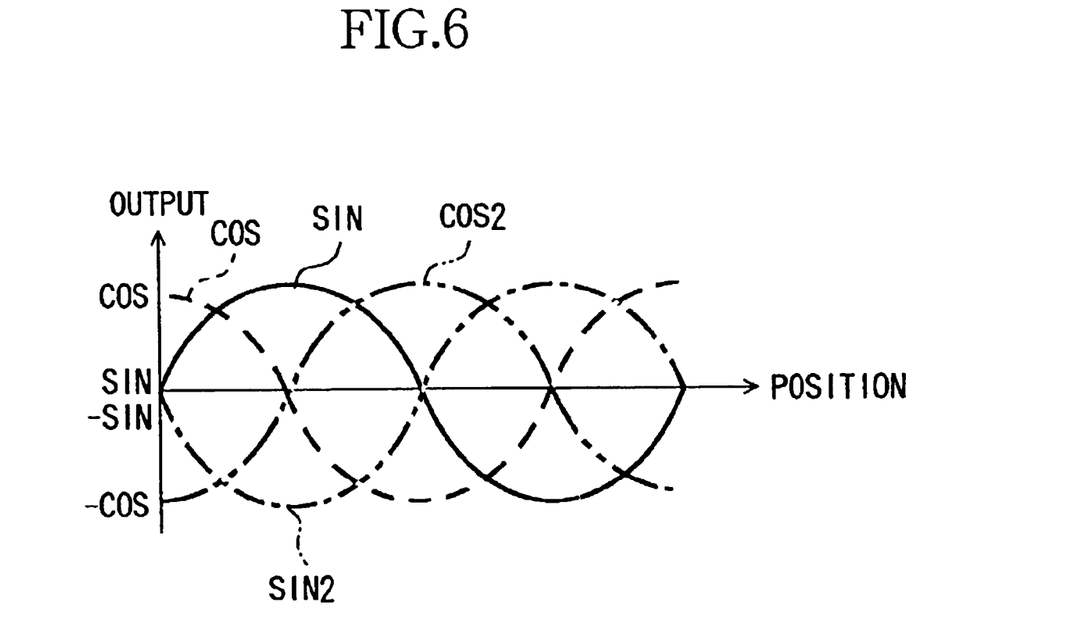
FIG. 6 is a graph showing output signals of the MR sensor and signals obtained by reversing these output signals in polarities.

At step 102, the primary position calculating section 7 as a first calculating unit generates four phases (SIN, COS, SIN2, and COS2) of signals by inverting respective phases of signals in polarities as shown in FIG. 6. In addition, this calculation is not always necessary if the position detecting signals outputted from the MR sensor 2a are three phases or more.

Figure 7:
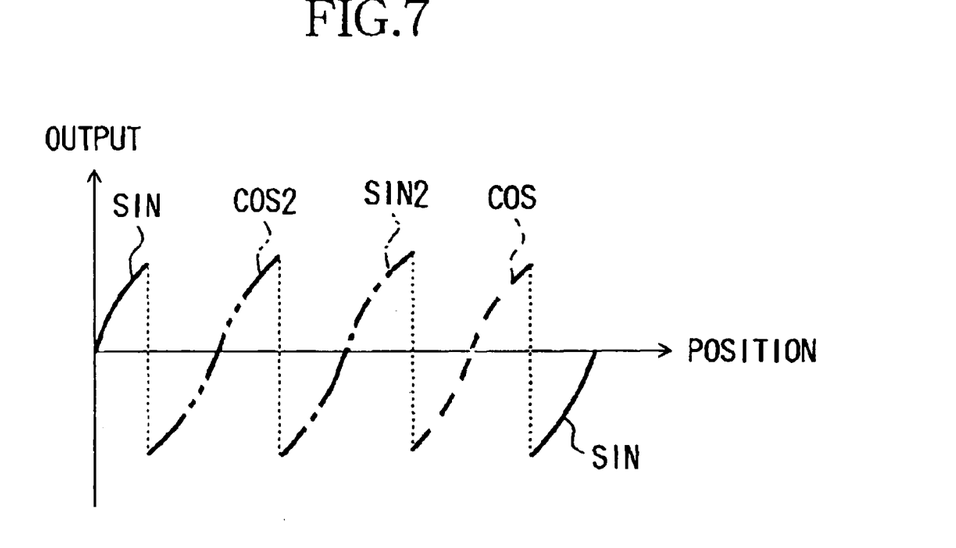
FIG. 7 is a graph obtained by selecting signal components excellent in linearity from four phases of signals shown in FIG. 6.

At step 103, the primary position calculating section 7 selects a phase with a signal component excellent in linearity among signal components of respective phases (SIN, COS, SIN2, and COS2) as shown in FIG. 7. At this time, the selected phase is switched in a period equal to each phase difference between phases.

Since the phases of the SIN and COS waves and the phases of the SIN2 and COS2 waves are different by 90° respectively, the selected phase is switched each time the focus lens 1 moves by 90° of phases of each position detecting signals outputted from the MR sensor 2a.

Figure 8:
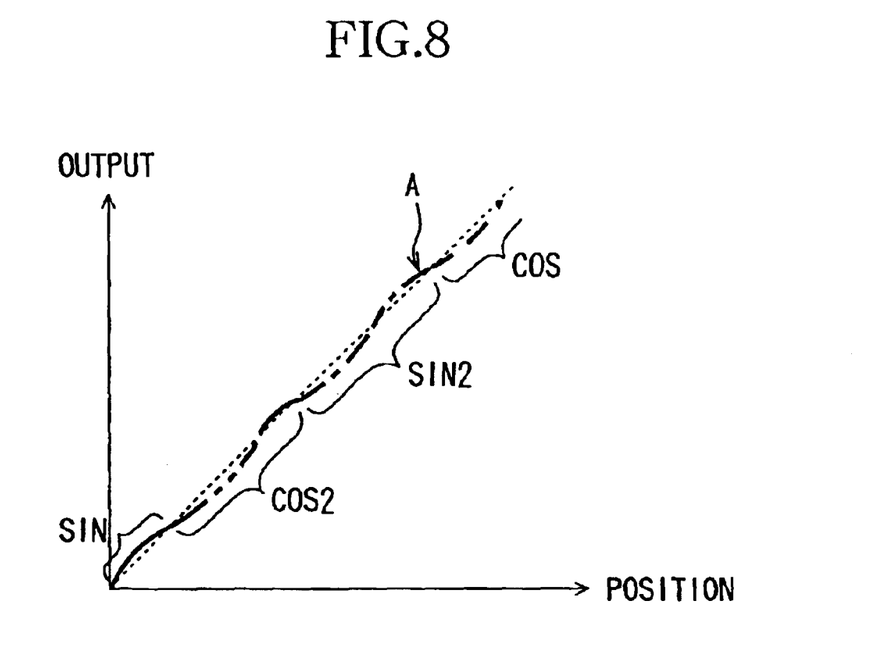
FIG. 8 is a graph showing position data (reference position data and supplementary position data) obtained by shifting the signal components, shown in FIG. 7, by gains.

At step 104, the primary position calculating section 7 shifts the signal component of the selected phase by a gain of the signal component before the phase changes each time the phase selected in the processing at step 103 as shown in FIG. 8 changes. Owing to this, it is possible to obtain reference position data A that changes approximately linearly to a position of the focus lens 1.

Figure 9:
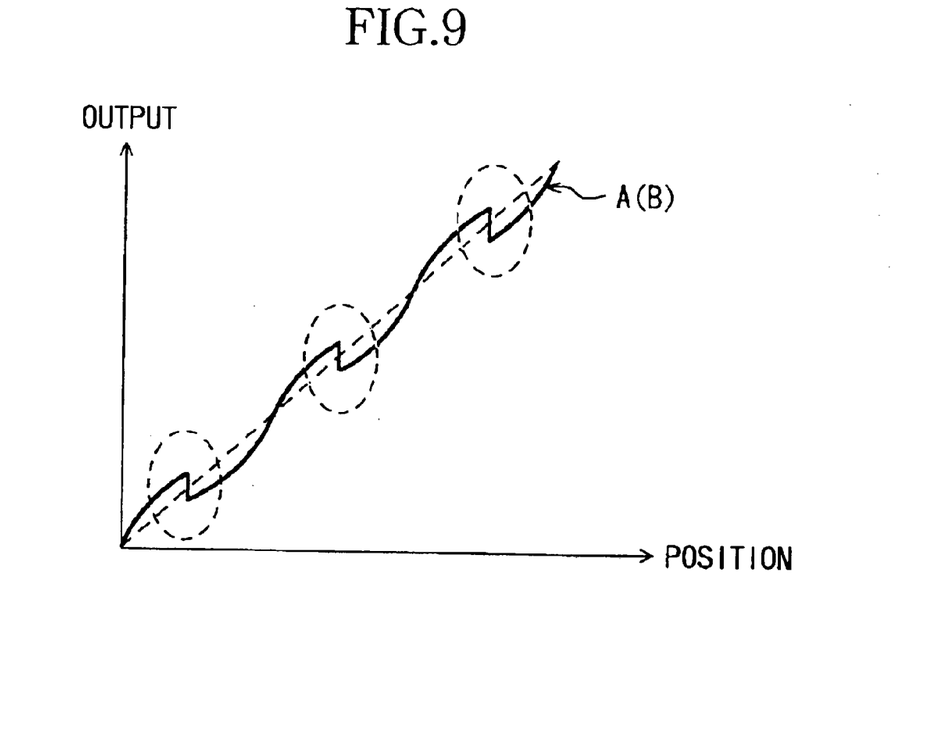
FIG. 9 is a graph showing the case that gains and offsets shift to outputs of the MR sensor in the position data shown in FIG. 7.

Here, in the processing of shifting the signal component at step 104, with assuming that the gain adjustment and offset adjustment of the position detecting signals are accurately performed in the gain and offset adjusting section 6, the primary position calculating section 7 shifts the signal by a gain of the signal component that is assumed beforehand. Therefore, if the gain and offset adjustment is not accurately performed, discontinuous portions are generated in the reference position data A like portions enclosed with dotted lines in FIG. 9.

Next, it will be described how the calculation for obtaining a position of the focus lens 1 in a phase converting section 8 and a secondary position calculating section 9 is performed.

At step 105, the phase converting section 8 converts a phase of each phase by synthesizing plural phases of signals that are outputted from the gain and offset adjusting section 6 and whose gains and offsets are adjusted. Namely, the phase converting section 8 outputs phase converted signals with different phases respectively that are generated by giving predetermined phase differences to the position detecting signals (plural phases of signals) outputted from the MR sensor 2a.

Figure 10:
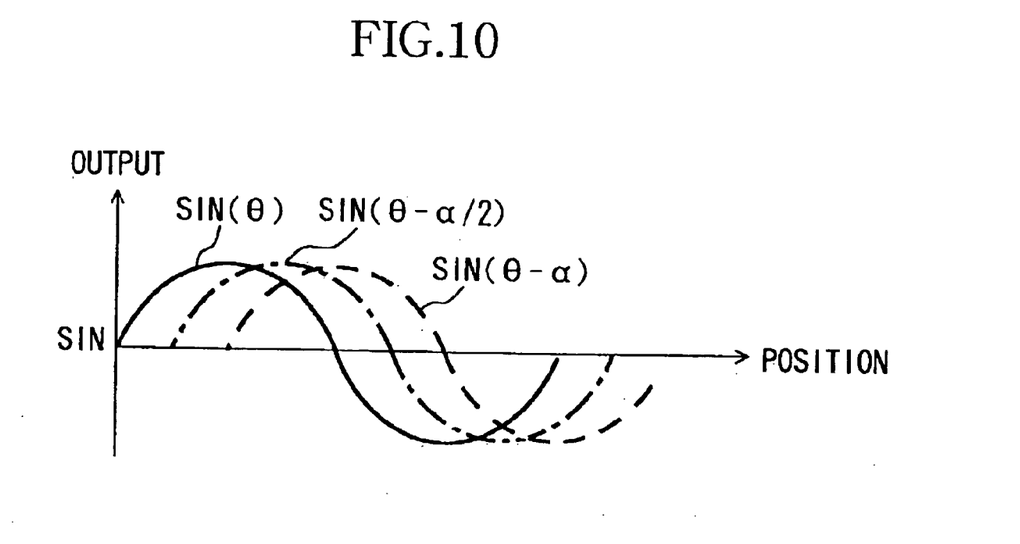
FIG. 10 is a graph showing signals after the conversion of shifting phases by using two different phases.

Specifically, the phase converting section 8 can generate a signal whose phase is shifted by $\alpha/2$ by the calculation shown in the following expression (1) from two phases that are different by $\alpha$, that is, $\sin\theta$ and $\sin(\theta-\alpha)$ as shown in FIG. 10.

$$\sin\left(\theta - \frac{\alpha}{2}\right) = \frac{1}{2\cos\frac{\alpha}{2}}\{\sin\theta + \sin(\theta - \alpha)\} \quad (1)$$

Figure 11:
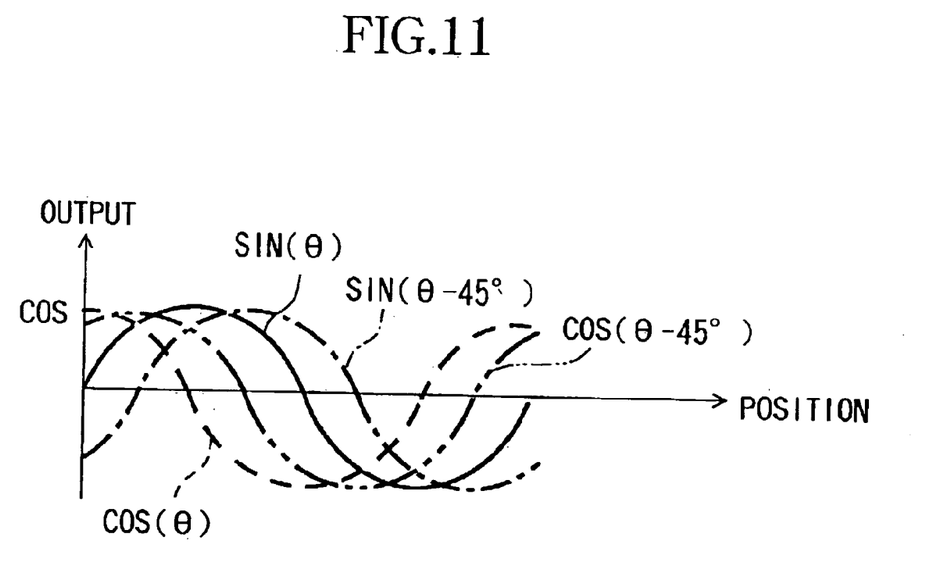
FIG. 11 is a graph showing signals after the conversion of shifting phases by 45° by using a sine wave and a cosine wave.

When the position detecting signals outputted from the MR sensor 2a are a sine wave and a cosine wave like those in this embodiment, the phase converting section 8 can generate signals, whose phases shift by 45° as shown in FIG. 11, by the following expression (2) and expression (3).

$$\sin(\theta - 45°) = \frac{1}{\sqrt{2}}\{\sin\theta - \cos\theta\} \quad (2)$$

$$\cos(\theta - 45°) = \frac{1}{\sqrt{2}}\{\sin\theta + \cos\theta\} \quad (3)$$

Next, the secondary position calculating section 9 as a second calculating unit calculates supplementary position data as second position data. The calculation of the supplementary position data in this secondary position calculating section 9 is similar to one performed by the primary position calculating section 7 (S106 to S108). Hereinafter, it will be specifically explained.

At step 106, the secondary position calculating section 9 generates four phases (hS, hC, hS2, and hC2) of signals by calculating signals whose phases are reversed on the basis of the two phases (plural phases) of signals whose phases are converted by the phase converting section 8.

At step 107, the secondary position calculating section 9 selects a newly synthesized component excellent in linearity among respective signal components of phases (hS, hC, hS2, and hC2). At this time, the selected phase is switched in a period equal to a phase difference between respective phases.

Since the phases of hS and hC and phases of hS2 and hC2 are different by 90° respectively, a selected phase switches each time the focus lens 1 moves by 90° of phase of each position detecting signal outputted from the MR sensor 2a.

At step 108, the secondary position calculating section 9 shifts a signal component of the selected phase by a gain of the component of the signal before the phase changes each time the phase selected in processing at step 107 changes. Owing to this, it is possible to obtain supplementary position data B that changes approximately linearly to a position of the focus lens 1.

Here, in the processing of shifting the signal component at step 108, with assuming that the gain adjustment and offset adjustment of the position detecting signals are accurately performed in the gain and offset adjusting section 6, the secondary position calculating section 9 shifts the signal by a gain of the signal component that is assumed beforehand. Therefore, if the gain and offset adjustment is not accurately performed, discontinuous portions are generated in the supplementary position data B similarly to the reference position data A.

Figure 12:
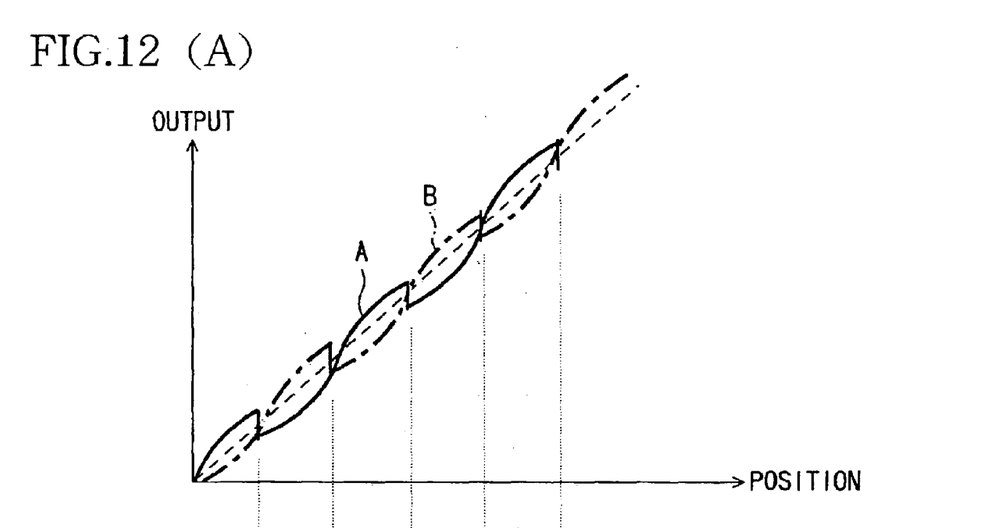
FIGS. 12(A) and 12(B) are a graph showing reference position data and supplementary position data, and a graph showing weight factors applied to the reference position data and supplementary position data respectively.

Here, since the signals inputted to the secondary position calculating section 9 are ones whose phases have been converted by the phase converting section 8, positions of discontinuous portions in the supplementary position data B generated by the secondary position calculating section 9 are different from those of the discontinuous portions in the reference position data A generated by the primary position calculating section 7 as shown in FIG. 12(A).

When phase differences between signals outputted from the phase converting section 8 and original position detecting signals (position detecting signals outputted from the MR sensor 2a) are 45° respectively like this embodiment, discontinuous portions in one position data out of the reference position data A and supplementary position data B are generated in an intermediate position between each two discontinuous portions in the other position data.

At step 109, a synthesized position calculating section 10 as a third calculating unit combines the reference position data A of the primary position calculating section 7 and the supplementary position data B of the secondary position calculating section 9. Hereinafter, this synthesizing method will be described. The synthesized position calculating section 10 calculates a current position of the focus lens 1 on the basis of the reference position data A and supplementary position data B.

As one method of combining the reference position data A and supplementary position data B, it is possible to make the result, which is obtained by simply averaging the reference position data A of the primary position calculating section 7 (shown by solid lines in FIG. 12(A)) and the supplementary position data B of the secondary position calculating section 9 (shown by a dotted and dashed line in FIG. 12(A)), be synthesized position data.

As described above, when the phase differences between the signals outputted from the phase converting section 8 and the original plural phases of position detecting signals are 45° respectively, it is possible to reduce the variation of discontinuous portions in the reference position data A and supplementary position data B to about ½.

In addition, as another synthesizing method, as shown in FIG. 12(B), it is also possible to make the sum of the data, which is weighted the reference position data A and supplementary position data B according to a position where a discontinuous portion is generated, be synthesized position data.

Namely, a weight coefficient ka ($0 \leq ka \leq 1$) shown by a solid line in FIG. 12(B) is applied to the reference position data A, and a weight coefficient kb (0≦kb≦1) shown by a dotted and dashed line is applied to the supplementary position data B. Then, the sum of these data is made to be synthesized position data. In the flow chart shown in FIG. 4, the synthesized position data is obtained by the latter synthesizing method (steps 109 and 110).

Here, the above-described weight coefficients ka and kb (kb=1−ka) are determined from a rough position of the focus lens 1. As this rough position, it is possible to use, for example, a position obtained from one position data out of the reference position data A and supplementary position data B, or to use a position obtained from position data obtained by simply averaging the reference position data A and supplementary position data B.

Since the position detecting apparatus in this embodiment is applied to a servo system of moving the focus lens 1 to a target stop position that is set beforehand, weight coefficients ka and kb are determined from the target stop position of the focus lens 1. The target stop position used here is not an in-focus position, but is a target stop position of the focus lens 1 that is set in the auto focus processing section 12 one by one when the above-described auto focus processing is performed.

It is good to execute the calculation processing in the gain and offset adjusting section 6, primary position calculating section 7, secondary position calculating section 9, phase converting section 8, and synthesized position calculating section 10 respectively in different CPUs or DSPs, or it is also good to execute this processing in a single CPU or DSP. In addition, it is also possible to use dedicated hardware that performs the above-described calculation processing.

As described above, the position detecting apparatus according to this embodiment calculates a current position of the focus lens 1 on the basis of the signals, outputted from the MR sensor 2a, and signals (phase converted signal) obtained by giving phase differences to these signals.

Here, though the calculation processing shown in steps 106 to 108 is performed to the phase converted signals, these phase converted signals have phase differences to the original position detecting signals (signals outputted from the MR sensor 2a). Hence, discontinuous portions in the supplementary position data B obtained by the above-described calculation processing become positions different from the discontinuous portion in the reference position data A.

A conventional position detecting apparatus detects a position of a measuring object by using only reference position data obtained by the calculation of position detecting signals outputted from the MR sensor.

On the other hand, in the position detecting apparatus according to this embodiment, the discontinuous portions that occur in the reference position data and supplementary position data are interpolated mutually by using the supplementary position data obtained by the calculation of the phase converted signals in addition to the above-described reference position data.

Owing to this, regardless of a current position of the focus lens 1, it is possible that a discontinuous portion may not occur in one position data out of the reference position data A and supplementary position data B. Then, the synthesized position calculating section 10 adequately combines results (reference position data A and supplementary position data B) in the primary position calculating section 7 and secondary position calculating section 9, and calculates (detects) a position of the focus lens 1. Hence, it is possible to perform position detection with high accuracy by suppressing the decrease of position detection accuracy because of discontinuous portions occurring in the position detection result (reference position data) that is a problem in conventional technology.

Embodiment 2

Figure 13:
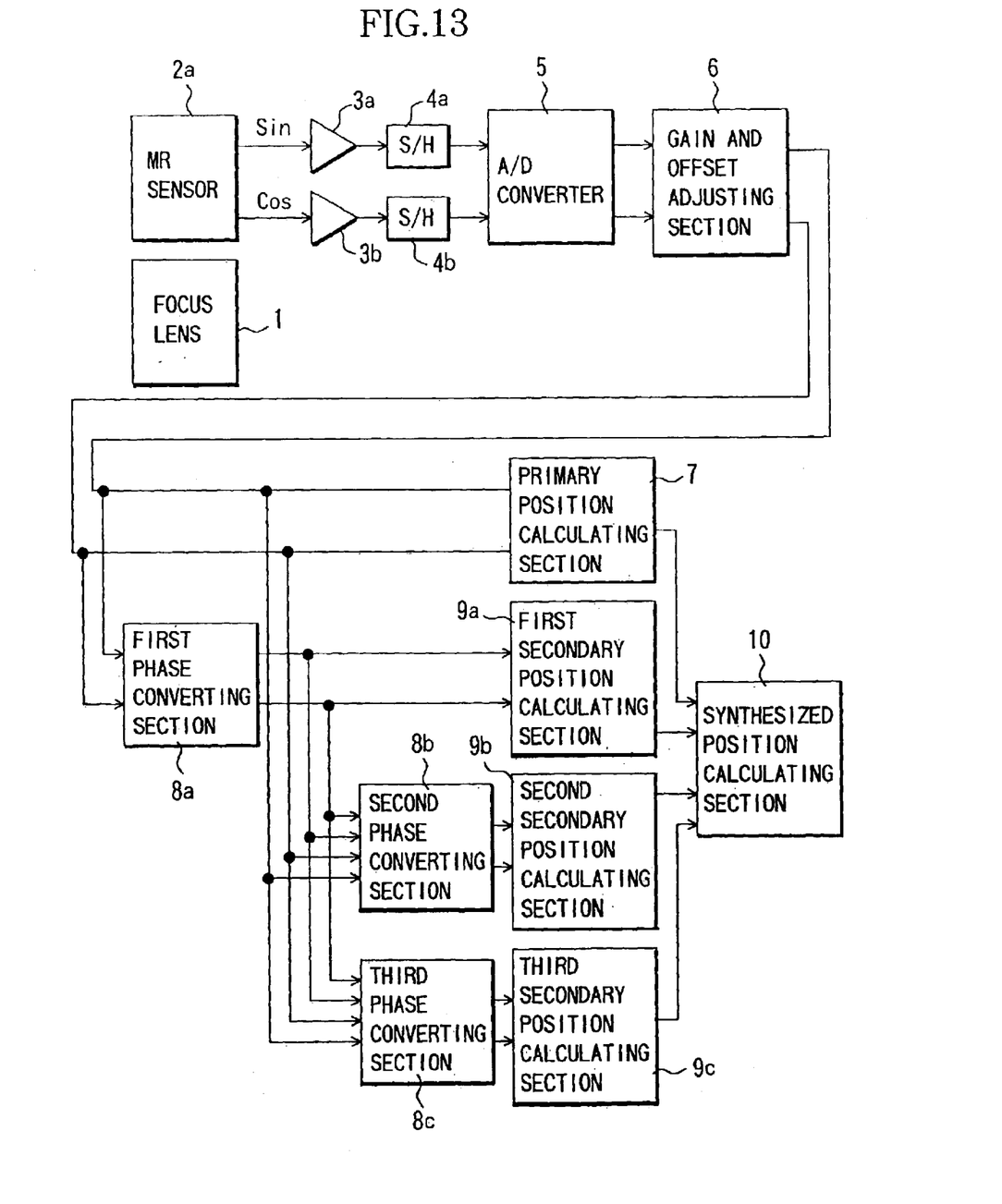
FIG. 13 is a block diagram showing the structure of a position detecting apparatus that is Embodiment 2.

FIG. 13 is a block diagram showing the structure of a position detecting apparatus that is Embodiment 2. In this embodiment, it is assumed that outputs (position detecting signals) of the MR sensor 2a are two phases, that is, a sine wave and a cosine wave similarly to those in Embodiment 1 described above. In addition, the structure of the MR sensor 2a is not limited to this, but the structure may have a three or more phase output.

In the diagram, since the structure of members from the focus lens 1 (measuring object) to the primary position calculating section 7 is similar to that of the members described in Embodiment 1, the same numerical references are used. In addition, each of a first phase converting section 8a and a first secondary position calculating section 9a corresponds to the phase converting section 8 and secondary position calculating section 9, described in Embodiment 1, respectively.

The second phase converting section 8b combines plural phases of signals outputted from the gain and offset adjusting section 6 and plural phases of signals (phase converted signals) outputted from the first phase converting section 8a, and moreover, converts a phase of each phase (further gives phase difference to each phase).

Here, as described by using FIG. 10, the first phase converting section 8a generates signals, whose phases are shifted by α/2 respectively, from two phases, that is, sin θ and sin (θ−α) whose phases are different by α mutually. Therefore, the second phase converting section 8b can generate signals, whose phases are shifted by α/4 respectively, from two phases, that is, sin θ and sin (θ−α/2) whose phases are different by α/2 mutually.

Since the position detecting signals outputted from the MR sensor 2a are a sine wave and a cosine wave in this embodiment, the first phase converting section 8a generates signals whose phases are shifted by 45° respectively. Then, the second phase converting section 8b can generate two phases of signals whose phases are shifted by 22.5° owing to the following expression (4) and expression (5).

$$\sin(\theta - 22.5°) = \frac{1}{2\cos(22.5°)}\{\sin\theta + \sin(\theta - 45°)\} \quad (4)$$

$$\cos(\theta - 22.5°) = \frac{1}{2\cos(22.5°)}\{\cos\theta + \cos(\theta - 45°)\} \quad (5)$$

Similarly to the second phase converting section 8b described above, the third phase converting section 8c generates signals, whose phases are shifted, on the basis of the outputs of the gain and offset adjusting section 6 and first phase converting section 8a.

Specifically, the third phase converting section 8c can generate signals, whose phases are shifted by (π−α/4) respectively, from two phases, that is, sin θ and sin (θ−α/2) whose phases are different by α/2 mutually.

Since the position detecting signals outputted from the MR sensor 2a are a sine wave and a cosine wave in this embodiment, the third phase converting section 8c can generate two phases of signals, whose phases shift by 67.5° according to the following expression (6) and expression (7).

$$\sin(\theta - 67.5°) = \frac{1}{2\cos(22.5°)}\{\sin(\theta - 45°) - \sin\theta\} \quad (6)$$

$$\cos(\theta - 67.5°) = \frac{1}{2\cos(22.5°)}\{\cos(\theta - 45°) + \sin\theta\} \quad (7)$$

The above-described processing can generate signals (phase converted signals) that are given plural phase differences (22.5°, 45°, and 67.5°: phase differences are changed at the same interval), which are different mutually, to the position detecting signals (analog signals) outputted from the MR sensor 2a.

The calculation of position data by a second secondary position calculating section 9b as a second calculating unit and a third secondary position calculating section 9c is similar to the calculation (steps 102 to 104 in FIG. 4) performed in the primary position calculating section 7 described in Embodiment 1.

Namely, supplementary position data B (shown by a dotted line in FIG. 14(A)) is obtained by the calculation in the first secondary position calculating section 9a. Supplementary position data C (shown by a dotted and dashed line in FIG. 14(A)) is obtained by the calculation in the second secondary position calculating section 9b. And, supplementary position data D (shown by an alternate long and two short dashes line in FIG. 14(A)) is obtained by the calculation in the third secondary position calculating section 9c.

Here, since the signals inputted respectively to the secondary position calculating sections 9b and 9c are signals whose phases have been converted by the phase converting sections 8b and 8c, discontinuous portions of position data A to D are generated at mutually different positions as shown in FIG. 14(A).

In this embodiment, the signals outputted from the second phase converting section 8b and the signals outputted from the third phase converting section 8c are shifted by 22.5° and 67.5° respectively to the plural phases of original position detecting signals (signals outputted from the MR sensor 2a). Therefore, discontinuous portions that are generated in the reference position data A obtained by the calculation of the primary position calculating section 7, and the supplementary position data B to D obtained by the calculation of the secondary position calculating sections 9a to 9c are generated at equal intervals to the position of the focus lens 1 as shown in FIG. 14(A).

Here, let one phase difference out of predetermined plural phase differences, given to the position detecting signals outputted from the MR sensor 2a, be P0, and it is preferable that all of other phase differences P are set so as to satisfy the following condition:

$$P = P_0 \pm (1/2)^n \times P_0 \text{ (where, } n \geq 1\text{)} \quad (8)$$

In addition, it is made in this embodiment that the phase difference P0=45°.

In this manner, when it is made that the phase differences given to the position detecting signals outputted from the MR sensor 2a satisfy the condition of the above-described expression (8), it is possible to generate discontinuous portions, which are generated in the position data (reference position data (A) and supplementary position data (B to D)) obtained from the position detecting signals and phase converted signals, at just midpoint positions between the discontinuous portions in the other position data. Owing to this, it is possible to have advantageous effects similar to the advantageous effects described in Embodiment 1 described above.

In this embodiment, the synthesized position calculating section 10 combines the position data (reference position data and supplementary position data) outputted from the primary position calculating section 7 and secondary position calculating sections 9a to 9c by a method similar to the method described in Embodiment 1.

Namely, as one method of combining the reference position data A and supplementary position data B to D, it is possible to make the result, which is obtained by simply averaging the respective position data, be synthesized position data.

In addition, as another synthesizing method, as shown in FIG. 14(B), it is also possible to make the sum of the data, that is weighted the respective position data A to D according to a position where a discontinuous portion is generated, be synthesized position data.

Namely, as shown in FIG. 14(B), weight coefficients Ka, kb, kc, and kd are multiplied by respective position data of the reference position data A and supplementary position data B to D, and the sum of these is made to be the synthesized position data.

Figure 14:
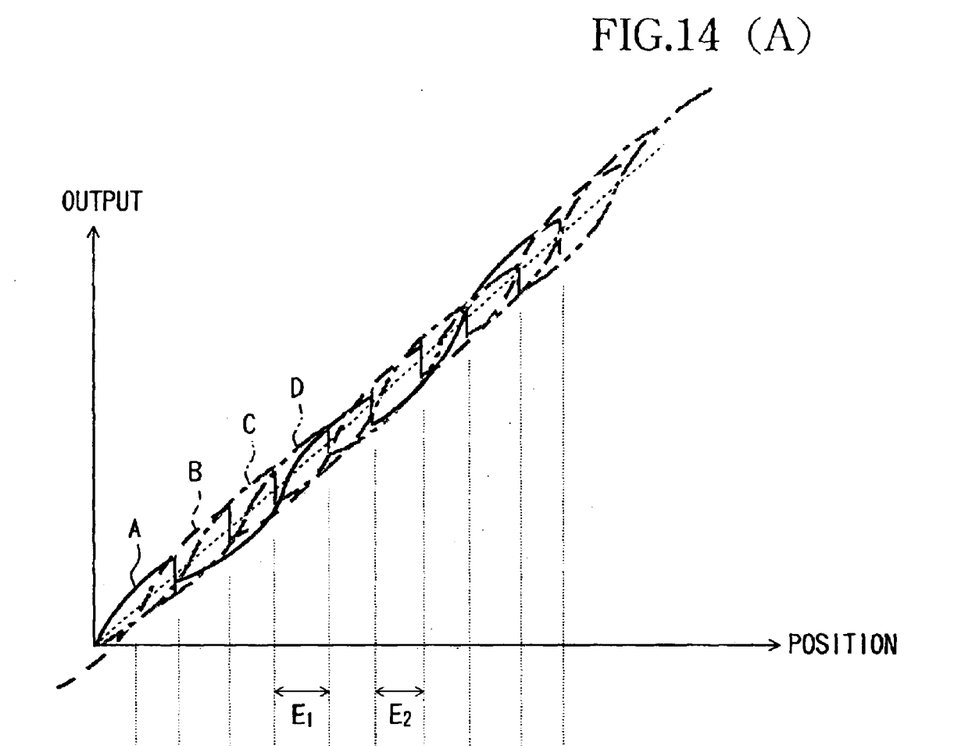
FIGS. 14(A) and 14(B) are a graph showing reference position data and supplementary position data, and a graph showing weight factors applied to the reference position data and supplementary position data in Embodiment 2 respectively.

For example, in an E1 area of FIG. 14, the sum of a product of the reference position data A multiplied by the weight coefficient ka (shown by a solid line in FIG. 14(B)), and another product of the supplementary position data B multiplied by the weight coefficient kb (shown by a dotted line in FIG. 14(B)) is made to be the synthesized position data. In addition, in an E2 area of FIG. 14(B), the sum of a product of the supplementary position data C multiplied by the weight coefficient kc (shown by an alternate long and short dash line in FIG. 14(B)), and another product of the supplementary position data D multiplied by the weight coefficient kd (shown by an alternate long and two short dashes line in FIG. 14(B)) is made to be the synthesized position data.

In this case, the above-described weight coefficients ka to kd are determined from a rough position of the focus lens 1.

As this rough position, it is possible to use, for example, a position obtained from one position data out of four position data (A to D), or a position obtained from position data obtained by simply averaging respective position data.

Since the position detecting apparatus in this embodiment is applied to a servo system of moving the focus lens 1 to a target stop position that is set beforehand, weight coefficients ka to kd are determined from the target stop position of focus lens 1.

The target stop position used here is not an in-focus position, but is a target stop position of the focus lens 1 that is set in the auto focus processing section 12 one by one when the auto focus processing described in Embodiment 1 is performed.

In addition, similarly to Embodiment 1 described above, it is good to execute the calculation processing in the gain and offset adjusting section 6, position calculating sections 7, and 9a to 9c, phase converting sections 8b and 8c, and synthesized position calculating section 10 respectively in different CPUs or DSPs, or it is also good to execute this processing in a single CPU or DSP.

In addition, it is possible to use dedicated hardware that performs these calculation processing. Furthermore, the means is not limited to the method of further giving phase differences to position detecting signals, which have been given phase differences once, like this embodiment, but it is good so long as signals whose phases are shifted consequentially. For example, it is also possible to generate the processing of giving the predetermined phase differences to the position detecting signals outputted from the MR sensor 2a by individually giving a phase difference, which is different from others, to the above-described position detecting signals.

According to the position detecting apparatus according to this embodiment, it is possible that a discontinuous portion, which is generated in each position data of the reference position data A and plural supplementary position data B, does not overlap with a discontinuous portion in other position data. In addition, by increasing the number of signals used for the position detection of the focus lens 1, that is, by generating a plurality of supplementary position data besides reference position data, the interpolation accuracy of the reference position data improves. Hence, it is possible to achieve position detection with higher accuracy.

In addition, the case of detecting a position of the focus lens 1 by using the detecting magnet 2b and MR sensor 2a is described in the above-described Embodiments 1 and 2. Nevertheless, the present invention can be also applied to the case of detecting a position of the focus lens 1 by using the optical scale 2d and optical encoder 2c instead of the detecting magnet and MR sensor as shown in FIG. 2(C).

The optical encoder 2c comprises a light-emitting section and a light-receiving section, and reflects light, emitted from the light-emitting section by the optical scale 2d and outputs a signal corresponding to quantity of light detected by the light-receiving section. The optical scale 2d has a reflecting surface whose shape (direction) periodically changes in the direction parallel to an optical axis.

Then, it is possible to generate a sinusoidal signal similar to that of the MR sensor by the shape of this optical scale 2d and the processing of a received light signal from the optical encoder 2c. Therefore, it is possible to apply a position detection method that is similar to the description in Embodiments 1 and 2. Specific processing is the same as those in embodiments above described.

On the other hand, though the position detection of a focus lens included in an image pickup optical system of a camera is described in each of the above-described embodiments, the present invention can be also applied to an apparatus performing the position detections of a movable optical element except the focus lens (for example, a zoom lens) or a movable object except the optical element.

As described above, according to the present invention, it is possible to achieve highly accurate position detection by suppressing the decrease of position detecting accuracy that is caused by discontinuous position data and is a problem in conventional technology.

While preferred embodiments have been described, it is to be understood that modification and variation of the present invention may be made without departing from the sprit or scope of the following claims.

What is claimed is:

1. A position detecting apparatus that detects a position of an object, comprising:
a position sensor that outputs a plurality of position detecting signals which have different phases respectively that change periodically according to a movement of the object;
a phase converting unit that generates a plurality of phase converted signals, from the plurality of position detecting signals, which have different phases respectively by giving each predetermined phase difference to the plurality of position detecting signals;
a first calculating unit that obtains first position data corresponding to a position of the object on the basis of the plurality of position detecting signals;
a second calculating unit that obtains second position data corresponding to a position of the object on the basis of the plurality of phase converted signals generated by the phase converting unit; and
a third calculating unit that obtains a position of the object on the basis of the first position data and the second position data.

2. The position detecting apparatus according to claim 1, further comprising:
a plurality of phase converting units that generates a plurality of phase converted signals by giving phase differences, which are respectively different, to the position detecting signals; and
a plurality of second calculating units that obtains each of a plurality of second position data on the basis of the phase converted signals generated by each of the plurality of phase converting units,
wherein the third calculating unit obtains a position of the object on the basis of the first position data and the plurality of second position data.

3. The position detecting apparatus according to claim 2, wherein the following condition is satisfied:

$$P = P_0 \pm (1/2)^n \times P_0$$

where $P_0$ denotes one phase difference out of the plurality of phase differences, P denotes each of the other phase differences, and n is a integral number larger than 1.

4. The position detecting apparatus according to claim 3, wherein the phase difference P0 is 45°.

5. The position detecting apparatus according to claim 2, wherein the respectively different plural phase differences are phase differences that are changed at the same interval.

6. The position detecting apparatus according to claim 2, wherein the respectively different plural phase differences are 22.5°, 45°, and 67.5°.

7. The position detecting apparatus according to claim 1, wherein the plural phases of position detecting signals are constituted of four phases of signals, that is, a sine wave, a cosine wave, and positive and negative signals obtained by reversing their polarity.

8. The position detecting apparatus according to claim 1, wherein the position sensor comprises a magnetic member periodically magnetized, and a magnetic detector that relatively moves with the magnetic member in connection with the movement of the object and outputs a plurality of position detecting signals according to a magnetic change due to the movement of the object.

9. The position detecting apparatus according to claim 1, wherein the position sensor comprises an optical scale member having a reflecting surface whose shape periodically changes, and an optical detector that relatively moves with the optical scale member in connection with the movement of the object and outputs a plurality of position detecting signals according to quantity of received light from light, which is reflected on the optical scale member that changes due to the movement, among light irradiated to the optical scale.

10. An optical apparatus comprising:
an optical system; and
the position detecting apparatus according to claim 1 that detects a position of at least one optical element in the optical system.

11. A position detecting method that detects a position of an object, comprising:
a first step of outputting a plurality of position detecting signals which have different phases respectively that change periodically according to a movement of the object;

a second step of generating a plurality of phase converted signals, from the plurality of position detecting signals, which have different phases respectively by giving predetermined phase differences to the plurality of position detecting signals;

a third step of obtaining first position data corresponding to a position of the object on the basis of the plurality of position detecting signals;

a fourth step of obtaining second position data corresponding to a position of the object on the basis of the plurality of phase converted signals generated in the second step; and a fifth step of obtaining a position of the object on the basis of the first position data and the second position data.

12. The position detecting method according to claim 11, wherein a plurality of phase converted signals is generated at the second step by giving phase differences, which are respectively different, to the position detecting signals;

wherein each of a plurality of second position data is obtained on the basis of each of the plurality of phase converted signals at the fourth step; and wherein a position of the object is obtained on the basis of the first position data and the plurality of second position data at the fifth step.

13. An image reading apparatus comprising:

an image sensing unit that senses an object image;

an optical unit adapted to focus the object image;

a position sensor that outputs a plurality of position detecting signals which have different phases respectively that change periodically according to a movement of the object;

a phase converting unit that generates a plurality of phase converted signals, from the plurality of position detecting signals, which have different phases respectively by giving each predetermined phase difference to the plurality of position detecting signals;

a first calculating unit that obtains first position data corresponding to a position of the optical unit on the basis of the plurality of position detecting signals;

a second calculating unit that obtains second position data corresponding to a position of the optical unit on the basis of the plurality of phase converted signals generated by said phase converting unit; and a third calculating unit that obtains a position of the optical unit on the basis of the first position data and the second position data, wherein the image sensing unit senses the object image in the position obtained by the third calculating unit.

* * * * *